United States Patent
Chai et al.

(10) Patent No.: US 9,992,811 B2
(45) Date of Patent: Jun. 5, 2018

(54) RADIO CONNECTION RE-ESTABLISHMENT METHOD, USER EQUIPMENT AND BASE STATION

(71) Applicant: HUAWEI TECHNOLOGIES CO., LTD., Shenzhen (CN)

(72) Inventors: Li Chai, Beijing (CN); Bo Lin, Beijing (CN)

(73) Assignee: HUAWEI TECHNOLOGIES CO., LTD, Shenzhen (CN)

(*) Notice: Subject to any disclaimer, the term of this patent is extended or adjusted under 35 U.S.C. 154(b) by 86 days.

(21) Appl. No.: 14/229,294

(22) Filed: Mar. 28, 2014

(65) Prior Publication Data

US 2014/0213267 A1    Jul. 31, 2014

Related U.S. Application Data

(63) Continuation of application No. PCT/CN2012/082573, filed on Oct. 8, 2012.

(30) Foreign Application Priority Data

Sep. 30, 2011  (CN) .......................... 2011 1 0297970

(51) Int. Cl.
*H04W 76/00*    (2018.01)
*H04W 76/02*    (2009.01)
(Continued)

(52) U.S. Cl.
CPC ......... *H04W 76/028* (2013.01); *H04W 24/00* (2013.01); *H04W 48/08* (2013.01); *H04W 56/00* (2013.01)

(58) Field of Classification Search
CPC ... H04W 76/028; H04W 24/00; H04W 24/08; H04W 76/027; H04W 76/068;
(Continued)

(56) References Cited

U.S. PATENT DOCUMENTS

| 5,907,808 A | 5/1999 | Vaara et al. |
| 2009/0047960 A1* | 2/2009 | Gunnarsson ......... H04J 11/0093 455/436 |

(Continued)

FOREIGN PATENT DOCUMENTS

| CN | 1146271 A | 3/1997 |
| CN | 1398066 A | 2/2003 |

(Continued)

OTHER PUBLICATIONS

Chinese Office Action dated Oct. 13, 2014 in corresponding Chinese Patent Application No. 201110297970.9 (6 pages).

(Continued)

*Primary Examiner* — Matthew C Sams
(74) *Attorney, Agent, or Firm* — Staas & Halsey LLP

(57) ABSTRACT

The present invention discloses a radio connection re-establishment method, including: starting a first timer if a first preset number of out-of-synchronization indications are obtained continuously, where the first preset number and/or a duration of the first timer corresponds to a cell of highest signal quality measured by a user equipment UE; and triggering a radio resource control RRC re-establishment procedure if a second preset number of synchronization indications are not received before timeout of the first timer. The radio connection re-establishment method in the present invention reduces overhead.

7 Claims, 6 Drawing Sheets

(51) Int. Cl.
*H04W 48/08* (2009.01)
*H04W 24/00* (2009.01)
*H04W 56/00* (2009.01)

(58) Field of Classification Search
CPC ............ H04W 24/10; H04W 36/0055; H04W 36/0083; H04W 84/045; H04B 17/24; H04B 17/309; H04J 11/0093; H04L 5/001
See application file for complete search history.

(56) References Cited

U.S. PATENT DOCUMENTS

| | | | |
|---|---|---|---|
| 2009/0275334 A1 | 11/2009 | Xie et al. | |
| 2010/0240357 A1* | 9/2010 | Wu ...................... | H04W 24/00 455/424 |
| 2010/0240359 A1* | 9/2010 | Wu ...................... | H04W 24/00 455/424 |
| 2010/0330921 A1* | 12/2010 | Kim ..................... | H04W 24/10 455/67.11 |
| 2011/0021154 A1* | 1/2011 | Marinier ............... | H04W 72/02 455/67.11 |
| 2011/0051660 A1 | 3/2011 | Arora et al. | |
| 2011/0103221 A1* | 5/2011 | Lee ..................... | H04L 5/0007 370/216 |
| 2011/0216732 A1* | 9/2011 | Maeda .................. | H04W 4/08 370/329 |

FOREIGN PATENT DOCUMENTS

| | | |
|---|---|---|
| CN | 101227705 A | 7/2008 |
| CN | 102083161 A | 6/2011 |
| EP | 2337404 A1 | 6/2011 |
| EP | 2346286 A1 * | 7/2011 ............ H04W 4/08 |
| EP | 2352340 A1 | 8/2011 |
| EP | 2439983 A1 | 4/2012 |
| WO | WO 2007/129180 A2 | 11/2007 |
| WO | WO 2009/045078 A2 | 4/2009 |
| WO | WO 2010/105148 A1 | 9/2010 |
| WO | WO 2010105148 A1 * | 9/2010 ........... H04W 72/02 |
| WO | 2010148943 A1 | 12/2010 |

OTHER PUBLICATIONS

Chinese Search Report dated Sep. 26, 2014 in corresponding Chinese Patent Application No. 201110297970.9 (2 pages).

Extended European Search Report dated Apr. 13, 2015 in corresponding European Patent Application No. 12836302.5 (8 pages).

"*Enhancement of UE history information with HO cause*"; Huawei, Discussion & Decision; R3-082208; Jeju Island, Korea, Aug. 18-22, 2008; 2 pages.

*3rd Generation Partnership Project; Technical Specification Group Radio Access Network; Evolved Universal Terrestrial Radio Access (E-UTRA); Radio Resource Control (RRC); Protocol specification (Release 10)*; 3GGP TS 36.331 V10.3.0 (Sep. 2011) pp. 1-296.

International Search Report and Written Opinion PCT Forms PCT/ISA/210, PCT/ISA/220, and PCT/ISA/237, dated Jan. 17, 2013 in corresponding PCT Application No. PCT/CN2012/082573 (11 pages).

International Search Report dated Jan. 17, 2013 in corresponding International Patent Application No. PCT/CN2012/082573.

Extended European Search Report dated Jan. 17, 2018 in related European Patent Application No. 17177026.6 (9 pages).

* cited by examiner

RADIO CONNECTION RE-ESTABLISHMENT METHOD, USER EQUIPMENT AND BASE STATION

CROSS-REFERENCE TO RELATED APPLICATION

This application is a continuation of International Application No. PCT/CN2012/082573, filed on Oct. 8, 2012, which claims priority to Chinese Patent Application No. 201110297970.9, filed on Sep. 30, 2011, both of which are hereby incorporated by reference in their entireties.

TECHNICAL FIELD

The present invention relates to the radio communications field, and in particular, to a radio connection re-establishment method, a user equipment and a base station.

BACKGROUND

Currently, a small base station, for example, radio access points such as a micro base station (Pico), a home base station (HeNB), a micro base station (Femto), and a relay base station (Relay), may be installed in a coverage of a Long Term Evolution (Long Term Evolution, LTE) macro base station (Macro eNB). In this way, a user equipment (User Equipment, UE) is covered by both the Macro eNB and the small base station, the maximum capacity achievable by such a system is a sum of the capacity of the Macro eNB and the capacity of the small base station, and the entire communications system has a higher capacity than a conventional LTE macro base station network. In scenarios such as office buildings, shopping malls and campus networks, heterogeneous deployments of the small base station and the macro base station can be used to enhance network coverage effectively and improve spectrum efficiency. The small base stations may access the network in a wired or wireless manner.

In such heterogeneous system, the UE can only be connected to one cell, where the cell is called a serving cell of the UE. Generally, a base station may have one or more cells. If the small base station and the macro base station are deployed by using the same frequency, all base stations send downlink signals on the same carrier, where the downlink signals include downlink control domain signals and downlink data domain signals. Inter-cell interference distribution increases with the increase of density and complexity of cells deployed under such heterogeneous system, and is difficult to predict. Meanwhile, a radio resource control (RRC) re-establishment procedure triggered by radio link failure caused by interference will also increase.

Referring to FIG. 1, FIG. 1 is a schematic diagram of a UE in a heterogeneous system scenario. For example, in a scenario of a heterogeneous system composed of a macro base station and small base stations in a coverage range of the macro base station, a cell covered by the macro base station is a macro cell, and a cell covered by the small base station is a low-power node cell. In the heterogeneous system, it is assumed that a rapidly moving UE keeps traversing multiple low-power node cells in the coverage range of the macro cell. A coverage area of the low-power node cell is relatively small, and a diameter of the cell is generally less than 100 m. For a rapidly moving UE, when the UE moves to a location near a center of the low-power node cell, signal quality of the low-power node cell is high enough for meeting conditions of handover from the macro cell to the low-power node cell. In this case, the macro base station determines to hand over the UE to the low-power node cell.

However, because the UE moves at a high speed, the UE will soon move into the coverage range of the macro cell outside the low-power node cell, whereupon the macro base station hands over the UE from the low-power node cell to the macro cell again. In this way, because the UE keeps traversing between multiple low-power node cells in the coverage range of the macro cell, the UE keeps handing over from the macro cell to the low-power node cell and handing over from the low-power node cell to the macro cell, which generates much signaling overhead.

SUMMARY

To solve a problem of much signaling overhead caused by frequent handover between cells in the prior art, multiple aspects of the present invention provide a radio connection re-establishment method, a user equipment, and a base station.

One aspect of the present invention provides a radio connection re-establishment method, including:

measuring neighboring cells, and obtaining a cell of highest signal quality;

receiving an out-of-synchronization indication;

starting a first timer if a first preset number of the out-of-synchronization indications are obtained continuously, where the first preset number is a preset number corresponding to the cell of the highest signal quality, and/or a duration of the first timer is a duration corresponding to the cell of the highest signal quality; and triggering a radio resource control RRC re-establishment procedure if a second preset number of synchronization indications are not received before timeout of the first timer.

Another aspect of the present invention provides a user equipment, including:

a first processing unit, configured to start a first timer if a first preset number of out-of-synchronization indications are obtained continuously, where the first preset number and/or a duration of the first timer corresponds to a cell of highest signal quality measured by the user equipment UE; and a second processing unit, configured to trigger a radio resource control RRC re-establishment procedure if a second preset number of synchronization indications are not received before timeout of the first timer.

Another aspect of the present invention provides a radio connection re-establishment method, including:

obtaining multiple first preset numbers, where the multiple first preset numbers correspond to different cell coverage ranges, or correspond to different transmit power strengths, or correspond to PCIs of different cells, or correspond to types of different cells, or correspond to first ranges of different cells, where different types of cells have different coverage ranges or different transmit power, and the first range is a range in which signal strength of this cell is greater than signal strength of a macro cell; and sending the multiple first preset numbers to a user equipment.

Another aspect of the present invention provides a radio connection re-establishment method, including:

obtaining multiple durations, where the multiple durations correspond to different cell coverage ranges, or correspond to different transmit power strengths, or correspond to PCIs of different cells, or correspond to types of different cells, or correspond to first ranges of different cells, where different types of cells have different coverage ranges or different transmit power, and the first range is a range in which signal strength of this cell is greater than signal strength of a macro cell; and sending the multiple durations to a user equipment.

Another aspect of the present invention provides a base station, including:

an obtaining unit, configured to obtain multiple first preset numbers, where the multiple first preset numbers correspond to different cell coverage ranges, or correspond to different transmit power strengths, or correspond to PCIs of different cells, or correspond to types of different cells, or correspond to first ranges of different cells, where different types of cells have different coverage ranges or different transmit power, and the first range is a range in which signal strength of this cell is greater than signal strength of a macro cell; and a sending unit, configured to send the multiple first preset numbers to a user equipment.

Another aspect of the present invention provides a base station, including:

an obtaining unit, configured to obtain multiple durations, where the multiple durations correspond to different cell coverage ranges, or correspond to different transmit power strengths, or correspond to PCIs of different cells, or correspond to types of different cells, or correspond to first ranges of different cells, where different types of cells have different coverage ranges or different transmit power, and the first range is a range in which signal strength of this cell is greater than signal strength of a macro cell; and a sending unit, configured to send the multiple durations to a user equipment.

In the radio connection re-establishment method in the embodiments of the present invention, the first preset number and/or the duration of the first timer corresponds to the cell of the highest signal quality measured by the UE. Therefore, if the UE moves again to a location of the highest signal quality in a source macro cell before obtaining the first preset number of out-of-synchronization indications continuously or before timeout of the first timer, handover from the source macro cell to the cell of the highest signal quality and inverse handover are avoided, which saves signaling overhead.

DESCRIPTION OF EMBODIMENTS

To make the objectives, technical solutions, and advantages of embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
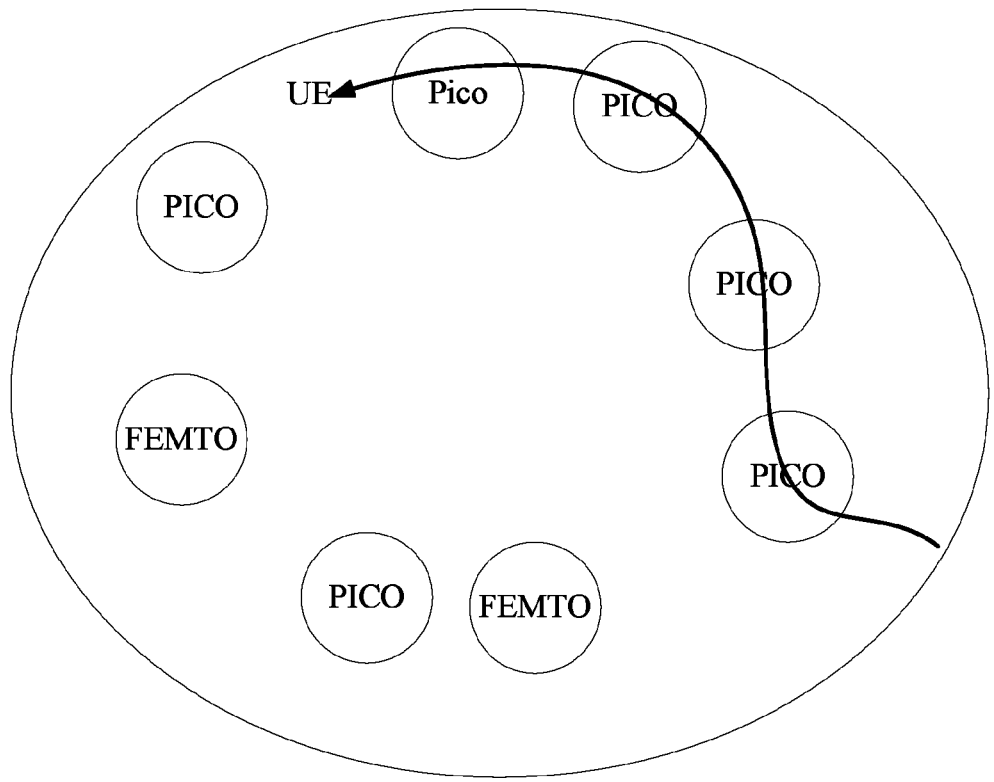
FIG. 1 is a schematic diagram of a UE in a heterogeneous system scenario.
Figure 2:
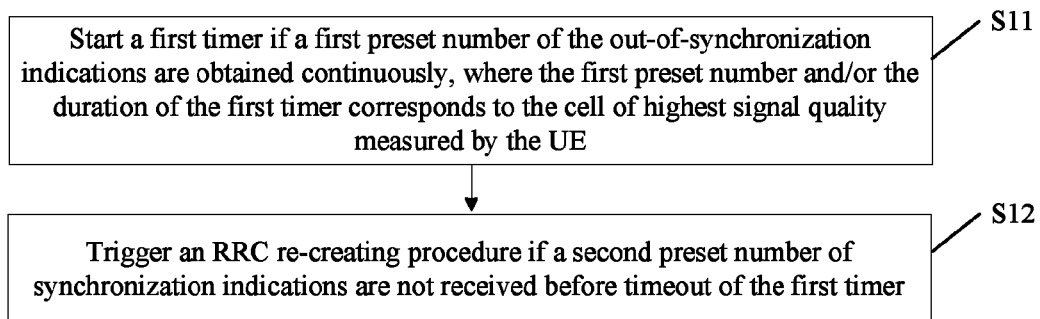
FIG. 2 is a flowchart of a radio connection re-establishment method according to an embodiment of the present invention.

Referring to FIG. 2, FIG. 2 is a flowchart of a radio connection re-establishment method according to an embodiment of the present invention. The method includes the following steps:

S11. Start a first timer if a first preset number of out-of-synchronization indications are obtained continuously, where the first preset number and/or a duration of the first timer corresponds to a cell of highest signal quality measured by a UE.

S12. Trigger an RRC re-establishment procedure if a second preset number of synchronization indications are not received before timeout of the first timer.

In the radio connection re-establishment method in the embodiment, the first preset number and/or the duration of the first timer corresponds to the cell of the highest signal quality measured by the UE. Therefore, if the UE moves again to a location of the highest signal quality in a source macro cell before obtaining the first preset number of out-of-synchronization indications continuously or before timeout of the first timer, handover from the source macro cell to the cell of the highest signal quality and inverse handover are avoided, which saves signaling overhead.

Figure 3:
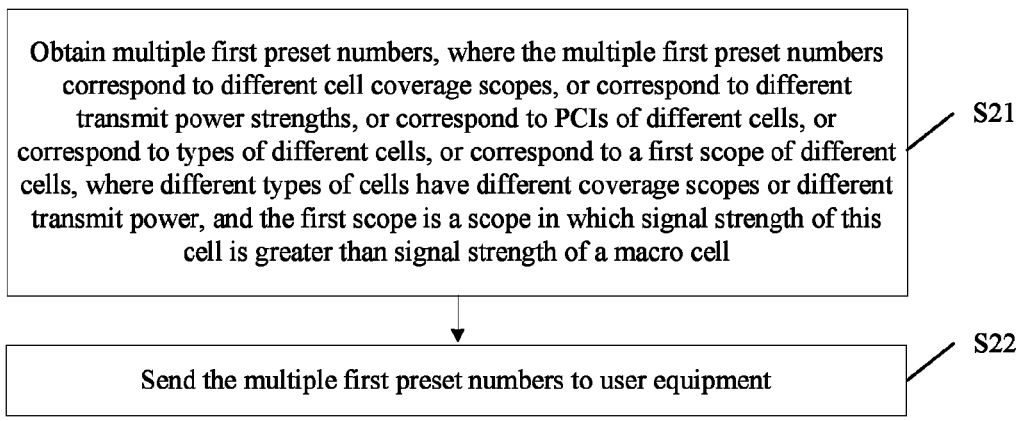
FIG. 3 is a flowchart of a radio connection re-establishment method according to another embodiment of the present invention.

Referring to FIG. 3, FIG. 3 is a flowchart of a radio connection re-establishment method according to another embodiment of the present invention. The method includes the following steps:

S21. Obtain multiple first preset numbers, where the multiple first preset numbers correspond to different cell coverage ranges, or correspond to different transmit power strengths, or correspond to PCIs of different cells, or correspond to types of different cells, or correspond to first ranges of different cells, where different types of cells have different coverage ranges or different transmit power, and the first range is a range in which signal strength of this cell is greater than signal strength of a macro cell.

S22. Send the multiple first preset numbers to a user equipment.

Figure 4:
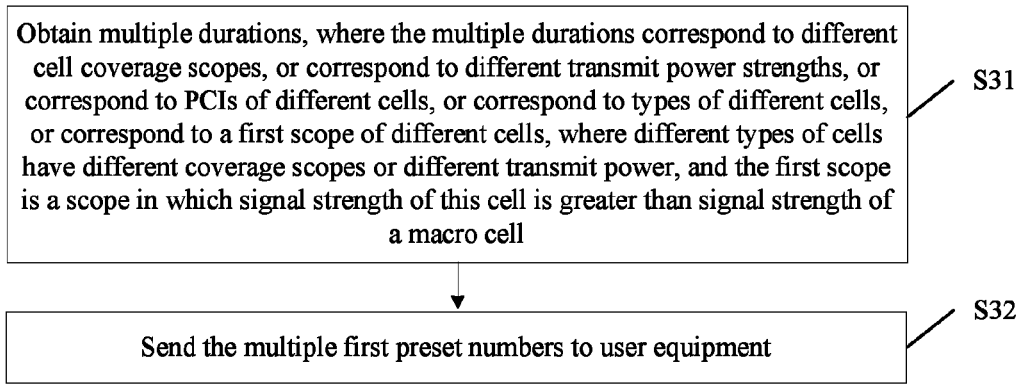
FIG. 4 is a flowchart of a radio connection re-establishment method according to another embodiment of the present invention.

Referring to FIG. 4, FIG. 4 is a flowchart of a radio connection re-establishment method according to another embodiment of the present invention. The method includes the following steps:

S31. Obtain multiple first preset numbers, where the multiple first preset numbers correspond to different cell coverage ranges, or correspond to different transmit power strengths, or correspond to PCIs of different cells, or correspond to types of different cells, or correspond to first ranges of different cells, where different types of cells have different coverage ranges or different transmit power, and the first range is a range in which signal strength of this cell is greater than signal strength of a macro cell.

S32. Send the multiple first preset numbers to a user equipment.

Figure 5:
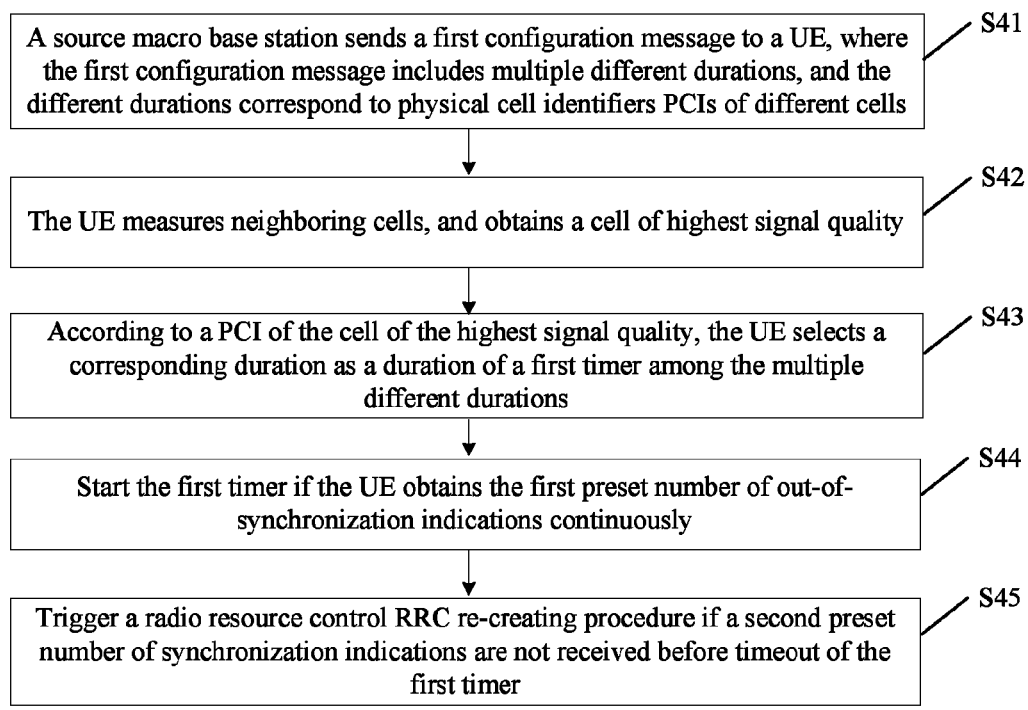
FIG. 5 is a flowchart of a radio connection re-establishment method according to another embodiment of the present invention.

Referring to FIG. 5, FIG. 5 is a flowchart of a radio connection re-establishment method according to another embodiment of the present invention. The method is applicable to a UE that moves at a speed higher than a threshold such as 120 km/h. The method includes the following steps:

S41. A source macro base station sends a first configuration message to a UE, where the first configuration message includes multiple different durations, and the different durations correspond to physical cell identifiers PCIs of different cells.

In an implementation manner of the embodiment, the first configuration message may include a timer duration array such as {0 ms, 50 ms, 100 ms, 200 ms, 500 ms, 1000 ms, 2000 ms}. Each value in the array represents a different duration, and corresponds to a PCI of a different cell. For example, there are a total of 7 small base stations in a coverage range of the source macro base station, and therefore, the array may include 7 values that correspond to PCIs of the 7 small base stations respectively. The PCI may be dependent on an order of the values in the array. For example, the first value in the array corresponds to the first PCI, the fifth value in the array corresponds to the fifth PCI, and the seventh value in the array corresponds to the seventh PCI. In this case, it is assumed that a coverage range of a cell corresponding to the seventh PCI has a 50-meter radius, the seventh value in the array may be set to 2000 ms, that is, a corresponding timer duration is set to 2000 ms. Further, it is assumed that a coverage range of a cell corresponding to the fifth PCI has a 20-meter radius, the fifth value in the array may be set to 500 ms, that is, a corresponding timer duration is set to 500 ms. Definitely, each timer duration may correspond to PCIs of multiple different cells, and the details are not repeated herein.

In another implementation manner of the embodiment, the first configuration message may include a timer information list Timer list, where the timer information list includes multiple pieces of timer information Timer 1, Timer 2, . . . . Each piece of timer information includes a timer duration, and further includes a PCI(s) of one or more cells. For example:

Timer list:
Timer 1: 1000 ms, PCI1
Timer 2: 2000 ms, {PCI 3 . . . PCI 6}
. . . .

The timer duration included in the timer information Timer 2 is 2000 ms, and the cell PCIs are {PCI 3 . . . PCI 6}.

S42. The UE measures neighboring cells, and obtains a cell of highest signal quality.

In an implementation manner of the embodiment, a current serving cell of the UE is the source macro base station. The UE measures signal quality of the neighboring cells, and obtains the cell of the highest signal quality. When the UE enters a low-power node cell of a small base station, the obtained cell of the highest signal quality may be the low-power node cell.

S43. According to a PCI of the cell of the highest signal quality, the UE selects a corresponding duration as the duration of the first timer among the multiple different durations.

In an implementation manner of the embodiment, the UE selects a corresponding value in the array as the duration of the first timer according to the PCI of the cell of the highest signal quality. For example, the cell of the highest signal quality is a cell corresponding to the fourth PCI, and therefore, the fourth value ms 200 in the array is used as the duration of the first timer. In this way, the duration of the first timer is set to 200 ms.

S44. Start the first timer if the UE obtains the first preset number of out-of-synchronization indications continuously.

In an implementation manner of the embodiment, because the UE continues moving toward the center of the low-power node cell of the highest signal quality, interference caused by signals of the low-power node cell onto signals of the source macro base station increases gradually, so that the UE begins to be out of synchronization. If a lower layer of the UE reports the first preset number of out-of-synchronization indications to a higher layer continuously, the UE starts the first timer.

S45. Trigger a radio resource control RRC re-establishment procedure if a second preset number of synchronization indications are not received before timeout of the first timer.

In an implementation manner of the embodiment, it is deemed that the UE is re-synchronized with the source macro cell if the second preset number of synchronization indications are received before timeout of the first timer. If the second preset number of synchronization indications are not received before the timeout of the first timer, it is deemed that a radio link of the UE fails and the radio resource control RRC re-establishment procedure is triggered.

Optionally, the UE is preconfigured so that the UE uses the source macro cell under the source macro base station and/or other macro cells under the source macro base station as target cells selected with priority in the RRC re-establishment procedure. Or Optionally, after the UE measures the neighboring cells in S42, the UE sends a measurement result to the source macro base station. A second configuration message sent by the source macro base station according to the measurement result is received, where the second configuration message is used to indicate that a source macro cell under the source macro base station and/or other macro cells under the source base station are target cells selected with priority in the RRC re-establishment procedure.

Optionally, after S45, when knowing failure of the radio link of the UE, the source macro base station saves context information of the UE and starts a second timer. If the UE requests to create a connection with the source macro base station before timeout of the second timer, the source macro base station may use the saved context information to create a connection with the UE. If the UE still fails to create a radio connection with the source macro base station after the timeout of the second timer, the source macro base station releases the context information of the UE.

In the radio connection re-establishment method in the embodiment, the first preset number and/or the duration of the first timer corresponds to the cell of the highest signal quality measured by the UE. Therefore, if the UE moves again to a location of the highest signal quality in the macro cell before obtaining the first preset number of out-of-synchronization indications continuously or before timeout of the first timer, handover from the source macro cell to the cell of the highest signal quality and inverse handover are avoided, which saves signaling overhead.

Figure 6:
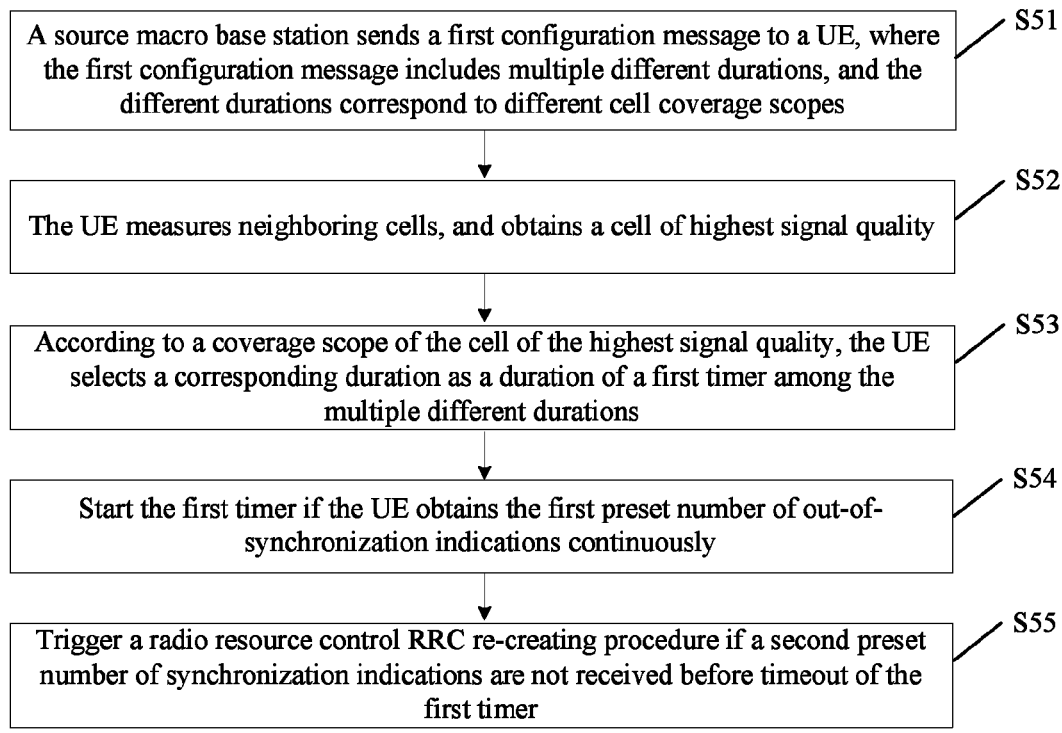
FIG. 6 is a flowchart of a radio connection re-establishment method according to still another embodiment of the present invention.

Referring to FIG. 6, FIG. 6 is a flowchart of a radio connection re-establishment method according to still another embodiment of the present invention. The method includes the following steps:

S51. A source macro base station sends a first configuration message to the UE, where the first configuration message includes multiple different durations, and the different durations correspond to different cell coverage ranges.

In an implementation manner of the embodiment, the first configuration message may include a timer duration array {ms 0, ms 50, ms 100, ms 200, ms 500, ms 1000, ms 2000}. Each value in the array represents a different duration, and corresponds to a different cell coverage range. For example, ms 0 corresponds to a cell coverage range that has a radius less than 10 meters; ms 50 corresponds to a cell coverage range that has a radius of 10 to 20 meters; . . . , and ms 2000 corresponds to a cell coverage range that has a radius of 60 to 70 meters.

S52. The UE measures neighboring cells, and obtains a cell of highest signal quality.

S52 is the same as S42, and is not repeated herein.

S53. According to a coverage range of the cell of the highest signal quality, the UE selects a corresponding duration as the duration of the first timer among the multiple different durations.

In an implementation manner of the embodiment, the UE selects a corresponding value in the array as the duration of the first timer according to a coverage range of the cell of the highest signal quality. For example, the coverage range of the cell of the highest signal quality has a 65-meter radius, and therefore, the seventh value ms 2000 in the array is used as the duration of the first timer.

S54. Start the first timer if the UE obtains the first preset number of out-of-synchronization indications continuously.

S55. Trigger a radio resource control RRC re-establishment procedure if a second preset number of synchronization indications are not received before timeout of the first timer.

S54 and S55 are the same as S44 and S45 respectively, and are not repeated herein.

In yet another embodiment, S41 to S43 may be respectively replaced with the following steps:

S41'. Receive a first configuration message sent by a network, where the first configuration message includes multiple different durations, the different durations correspond to types of different cells, and different types of cells have different coverage ranges or different transmit power.

For example, the cells may be classified into several types according the coverage size or the transmit power strength. For example, type 1 corresponds to the duration 2000 ms, type 2 corresponds to the duration 1000 ms, type 3 corresponds to the duration 500 ms, and so on. Each value in the array corresponds to a type.

S42'. Measure neighboring cells, and obtain the cell of the highest signal quality.

S43'. According to a type of the cell of the highest signal quality, select a corresponding duration as the duration of the first timer among the multiple different durations.

For example, the cell of the highest signal quality is of type 1, and therefore, the duration 2000 ms is selected as the duration of the first timer.

In other embodiments, S41 to S43 may be respectively replaced with:

receiving a first configuration message sent by a network, where the first configuration message includes multiple different durations, and the different durations correspond to different transmit power strengths;

measuring neighboring cells, and obtaining the cell of the highest signal quality; and according to a transmit power strength of the cell of the highest signal quality, selecting a corresponding duration as the duration of the first timer among the multiple different durations.

Alternatively, S41 to S43 may be respectively replaced with:

receiving a first configuration message sent by a network, where the first configuration message includes multiple different durations, the different durations correspond to first ranges of different cells, and the first range is a range in which signal strength of this cell is greater than signal strength of a macro cell;

measuring neighboring cells, and obtaining the cell of the highest signal quality; and according to a first range that covers the cell of the highest signal quality, selecting a corresponding duration as the duration of the first timer among the multiple different durations.

Alternatively, S41 to S43 may be respectively replaced with: receiving a first configuration message sent by a network, where the first configuration message includes one timer duration and multiple different scale factors, and the different scale factors correspond to different cell coverage ranges;

measuring neighboring cells, and obtaining the cell of the highest signal quality; and according to a coverage range of the cell of the highest signal quality, selecting a corresponding scale factor among the multiple different scale factors, multiplying the scale factor by the timer duration, and using a result of the multiplication as the duration of the first timer.

Alternatively, S41 to S43 may be respectively replaced with: receiving a first configuration message sent by a network, where the first configuration message includes one timer duration and multiple different scale factors, and the different scale factors correspond to different transmit power strengths;

measuring neighboring cells, and obtaining the cell of the highest signal quality; and according to a transmit power strength of the cell of the highest signal quality, selecting a corresponding scale factor among the multiple different scale factors, multiplying the scale factor by the timer duration, and using a result of the multiplication as the duration of the first timer.

Alternatively, S41 to S43 may be respectively replaced with: receiving a first configuration message sent by a network, where the first configuration message includes one timer duration and multiple different scale factors, and the different scale factors correspond to PCIs of different cells; and measuring neighboring cells, and obtaining the cell of the highest signal quality; and according to a PCI of the cell of the highest signal quality, selecting a corresponding scale factor among the multiple different scale factors, multiplying the scale factor by the timer duration, and using a result of the multiplication as the duration of the first timer.

Alternatively, S41 to S43 may be respectively replaced with: receiving a first configuration message sent by a network, where the first configuration message includes one timer duration and multiple different durations, the different scale factors correspond to types of different cells, and different types of cells have different coverage ranges or different transmit power;

measuring neighboring cells, and obtaining the cell of the highest signal quality; and according to a type of the cell of the highest signal quality, selecting a corresponding scale factor among the multiple different scale factors, multiplying the scale factor by the timer duration, and using a result of the multiplication as the duration of the first timer.

Alternatively, S41 to S43 may be respectively replaced with: receiving a first configuration message sent by a network, where the first configuration message includes one timer duration and multiple different scale factors, the different scale factors correspond to first ranges of different cells, and the first range is a range in which signal strength of this cell is greater than signal strength of a macro cell;

measuring neighboring cells, and obtaining the cell of the highest signal quality; and according to a first range of the cell of the highest signal quality, selecting a corresponding scale factor among the multiple different scale factors, multiplying the scale factor by the timer duration, and using a result of the multiplication as the duration of the first timer.

Alternatively, S41 to S43 may be respectively replaced with:

receiving a first configuration message sent by a network, where the first configuration message includes one timer duration and multiple different additional durations, and the different additional durations correspond to different cell coverage ranges;

measuring neighboring cells, and obtaining the cell of the highest signal quality; and according to a coverage range of the cell of the highest signal quality, selecting a corresponding additional duration among the multiple different additional durations, and using an algebraic sum of the corresponding additional duration and the timer duration as the duration of the first timer.

Alternatively, S41 to S43 may be respectively replaced with: receiving a first configuration message sent by a network, where the first configuration message includes one timer duration and multiple different additional durations, and the different additional durations correspond to different transmit power strengths;

measuring neighboring cells, and obtaining the cell of the highest signal quality; and according to a transmit power strength of the cell of the highest signal quality, selecting a corresponding additional duration among the multiple different additional durations, and using an algebraic sum of the corresponding additional duration and the timer duration as the duration of the first timer.

Alternatively, S41 to S43 may be respectively replaced with: receiving a first configuration message sent by a network, where the first configuration message includes one timer duration and multiple different additional durations, and the different additional durations correspond to PCIs of different cells;

measuring neighboring cells, and obtaining the cell of the highest signal quality; and according to a PCI of the cell of the highest signal quality, selecting a corresponding additional duration among the multiple different additional durations, and using an algebraic sum of the corresponding additional duration and the timer duration as the duration of the first timer.

Alternatively, S41 to S43 may be respectively replaced with: receiving a first configuration message sent by a network, where the first configuration message includes one timer duration and multiple different additional durations, the different additional durations correspond to types of different cells, and different types of cells have different coverage ranges or different transmit power;

measuring neighboring cells, and obtaining the cell of the highest signal quality; and according to a type of the cell of the highest signal quality, selecting a corresponding additional duration among the multiple different additional durations, and using an algebraic sum of the corresponding additional duration and the timer duration as the duration of the first timer.

Alternatively, S41 to S43 may be respectively replaced with: receiving a first configuration message sent by a network, where the first configuration message includes one timer duration and multiple different additional durations, the different additional durations correspond to first ranges of different cells, and the first range is a range in which signal strength of this cell is greater than signal strength of a macro cell;

measuring neighboring cells, and obtaining the cell of the highest signal quality; and according to a first range of the cell of the highest signal quality, selecting a corresponding additional duration among the multiple different additional durations, and using an algebraic sum of the corresponding additional duration and the timer duration as the duration of the first timer.

In the radio connection re-establishment method in the embodiment, the first preset number and/or the duration of the first timer corresponds to the cell of the highest signal quality measured by the UE. Therefore, if the UE moves again to a location of the highest signal quality in the macro cell before obtaining the first preset number of out-of-synchronization indications continuously or before timeout of the first timer, handover from the source macro cell to the cell of the highest signal quality and inverse handover are avoided, which saves signaling overhead.

Figure 7:
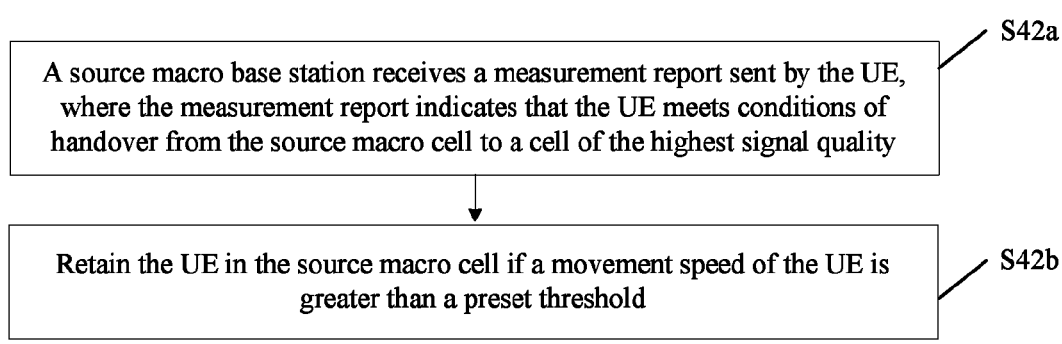
FIG. 7 is a flowchart of a radio connection re-establishment method according to yet another embodiment of the present invention.

Referring to FIG. 7, FIG. 7 is a flowchart of a radio connection re-establishment method according to yet another embodiment of the present invention. The method corresponding to FIG. 7 is basically the same as the method corresponding to FIG. 5, and main differences are: after S42 and before S44, the method further includes the following:

S42a. A source macro base station receives a measurement report sent by a UE, where the measurement report indicates that the UE meets conditions of handover from a source macro cell to a cell of the highest signal quality.

The source macro base station receives the measurement report about the cell of the highest signal quality from the UE. The measurement report may be obtained in S42 or obtained by performing a measurement again. The signal strength and/or the signal quality of the cell of the highest signal quality is good enough and meets the conditions of handover from the source macro cell to the cell of the highest signal quality.

S42b. Retain the UE in the source macro cell if a movement speed of the UE is greater than a preset threshold.

If the movement speed of the UE is greater than the preset threshold, it is deemed that the UE is a rapidly moving UE. Even if air interface conditions of the cell of the highest signal quality are good enough, according to location information about neighboring cells and/or neighboring cell relationships and the high-speed movement characteristic of the UE, the source macro base station determines not to hand over the UE to the cell of the highest signal quality, but to retain the UE in the source macro cell. It should be pointed out that, the embodiment does not restrict an order between S42a and S42b and S43, and S42a and S42b and S43 may be performed consecutively, or performed concurrently.

In the embodiment, although the signal strength and/or the signal quality of the cell of the highest signal quality is good enough and meets the conditions of handover from the source macro cell to the cell of the highest signal quality, because the UE is a rapidly moving UE and tends to move out of the cell of the highest signal quality rapidly, the source macro base station retaining the UE in the source macro cell may reduce meaningless handover between the cells, so as to reduce signaling overhead.

Figure 8:
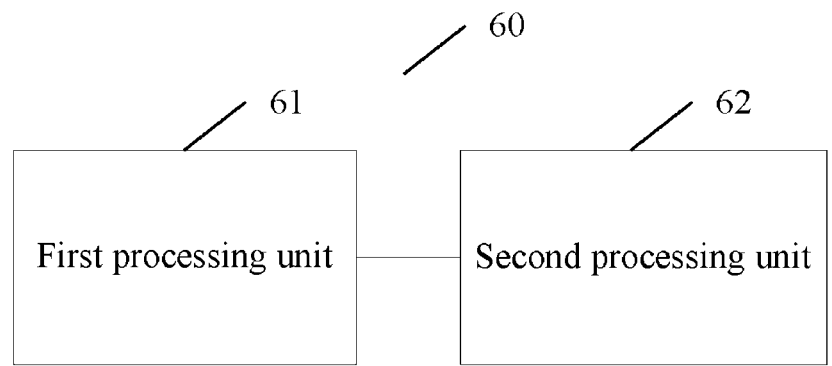
FIG. 8 is a structural block diagram of a UE according to an embodiment of the present invention.

Referring to FIG. 8, FIG. 8 is a structural block diagram of a UE according to an embodiment of the present invention. The UE may be used to implement the method provided in each embodiment of the present invention. The UE 60 includes:

a first processing unit 61, configured to start a first timer if a first preset number of out-of-synchronization indications are obtained continuously, where the first preset number and/or a duration of the first timer corresponds to a cell of highest signal quality measured by the user equipment UE; and a second processing unit 62, configured to trigger a radio resource control RRC re-establishment procedure if a second preset number of synchronization indications are not received before timeout of the first timer.

In an implementation manner of the embodiment, the first processing unit is specifically configured to start the first timer if the first preset number of the out-of-synchronization indications are obtained continuously, where the first preset number and/or the duration of the first timer corresponds to a coverage range of the cell of the highest signal quality measured by the UE; or the first preset number and/or the duration of the first timer corresponds to a transmit power strength of the cell of the highest signal quality measured by the UE; or the first preset number and/or the duration of the first timer corresponds to a physical cell identifier PCI of the cell of the highest signal quality measured by the UE; or the first preset number and/or the duration of the first timer corresponds to a type of the cell of the highest signal quality measured by the UE, and different types of cells have different coverage ranges or different transmit power; or the first preset number and/or the duration of the first timer corresponds to a first range of the cell of the highest signal quality measured by the UE, where the first range is a range in which signal strength of this cell is greater than signal strength of a source macro cell.

Figure 9:
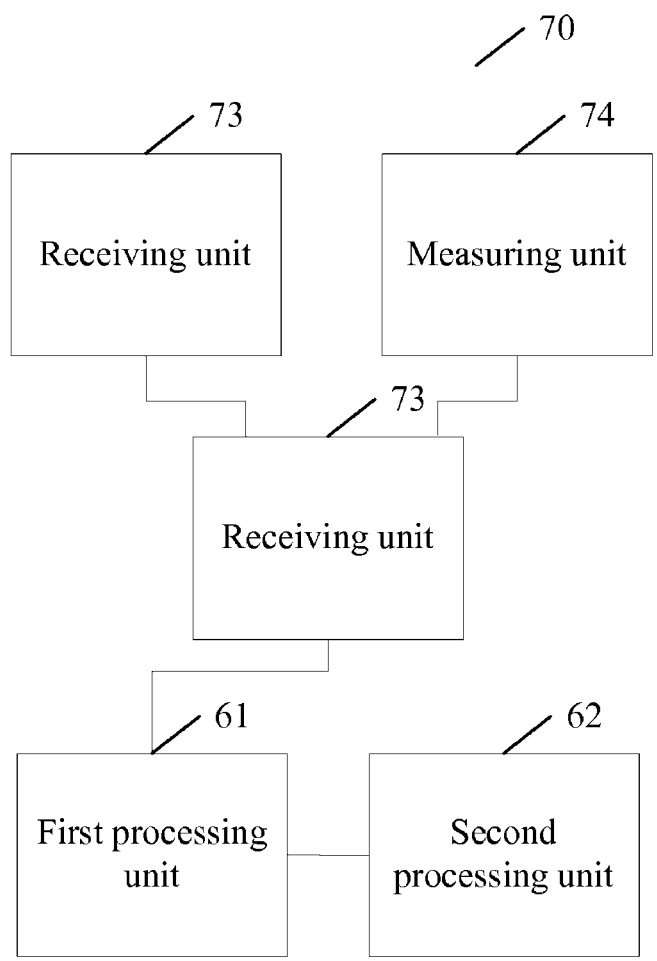
FIG. 9 is a structural block diagram of a UE according to another embodiment of the present invention.

Referring to FIG. 9, FIG. 9 is a structural block diagram of a UE according to another embodiment of the present invention. The UE 70 corresponding to FIG. 9 is basically the same as the UE 60 corresponding to FIG. 8, and main differences are: The UE 70 further includes a receiving unit 73, a measuring unit 74, and a selecting unit 75, where:

the receiving unit 73 is configured to receive a first configuration message sent by a network, where the first configuration message includes multiple different durations, and the different durations correspond to different cell coverage ranges;

the measuring unit 74 is configured to measure neighboring cells, and obtain a cell of highest signal quality; and the selecting unit 75 is configured to: according to a coverage range of the cell of the highest signal quality, select a corresponding duration as a duration of a first timer among the multiple different durations.

Alternatively, the receiving unit 73 is configured to receive a first configuration message sent by a network, where the first configuration message includes multiple different durations, and the different durations correspond to different transmit power strengths;

the measuring unit 74 is configured to measure neighboring cells, and obtain a cell of highest signal quality; and the selecting unit 75 is configured to: according to a transmit power strength of the cell of the highest signal quality, select a corresponding duration as a duration of a first timer among the multiple different durations.

Alternatively, the receiving unit 73 is configured to receive a first configuration message sent by a network, where the first configuration message includes multiple different durations, and the different durations correspond to PCIs of different cells;

the measuring unit 74 is configured to measure neighboring cells, and obtain a cell of highest signal quality; and the selecting unit 75 is configured to: according to a PCI of the cell of the highest signal quality, select a corresponding duration as a duration of a first timer among the multiple different durations.

Alternatively, the receiving unit 73 is configured to receive a first configuration message sent by a network, where the first configuration message includes multiple different durations, the different durations correspond to types of different cells, and different types of cells have different coverage ranges or different transmit power;

the measuring unit 74 is configured to measure neighboring cells, and obtain a cell of highest signal quality; and the selecting unit 75 is configured to: according to a type of the cell of the highest signal quality, select a corresponding duration as a duration of a first timer among the multiple different durations.

Alternatively, the receiving unit 73 is configured to receive a first configuration message sent by a network, where the first configuration message includes multiple different durations, the different durations correspond to first ranges of different cells, and the first range is a range in which signal strength of this cell is greater than signal strength of a macro cell;

the measuring unit 74 is configured to measure neighboring cells, and obtain a cell of highest signal quality; and the selecting unit 75 is configured to: according to a first range of the cell of the highest signal quality, select a corresponding duration as a duration of a first timer among the multiple different durations.

In an implementation manner of the embodiment, the second processing unit 62 is specifically configured to trigger a radio resource control RRC re-establishment procedure if a second preset number of synchronization indications are not received before timeout of the first timer, where a source macro cell under a source base station and/or other macro cells under the source base station are target cells selected with priority in the RRC re-establishment procedure.

In an implementation manner of the embodiment, the user equipment further includes a sending unit, configured to send a measurement result to the source base station.

The receiving unit 73 is further configured to receive a second configuration message sent according to the measurement result by the source base station, where the second configuration message is used to indicate that a source macro cell under the source base station and/or other macro cells under the source base station are target cells selected with priority in the RRC re-establishment procedure.

Figure 10:
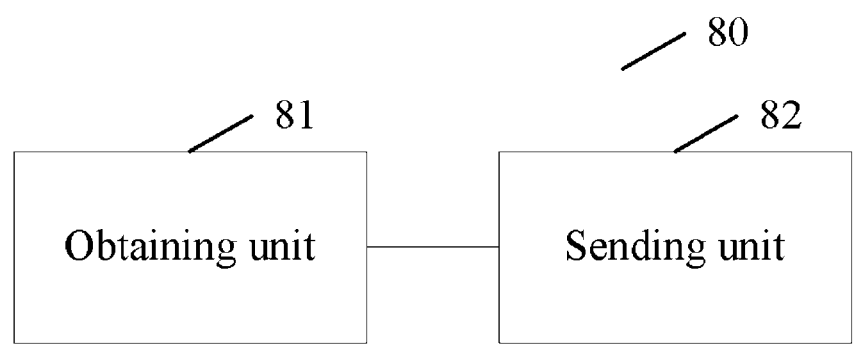
FIG. 10 is a structural block diagram of a base station according to an embodiment of the present invention.

Referring to FIG. 10, FIG. 10 is a structural block diagram of a base station according to an embodiment of the present invention. The base station 80 includes:

an obtaining unit 81, configured to obtain multiple durations, where the multiple durations correspond to different cell coverage ranges, or correspond to different transmit power strengths, or correspond to PCIs of different cells, or correspond to types of different cells, or correspond to first ranges of different cells, where different types of cells have different coverage ranges or different transmit power, and the first range is a range in which signal strength of this cell is greater than signal strength of a macro cell; and a sending unit 82, configured to send the multiple durations to a user equipment.

Figure 11:
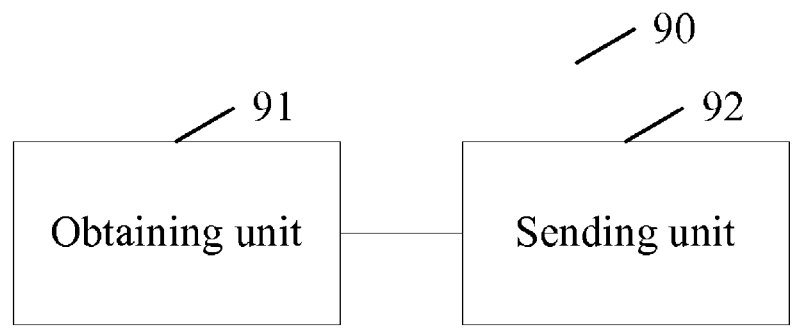
FIG. 11 is a structural block diagram of a base station according to another embodiment of the present invention.

Referring to FIG. 11, FIG. 11 is a structural block diagram of a base station according to another embodiment of the present invention. The base station 90 includes:

an obtaining unit 91, configured to obtain multiple first preset numbers, where the multiple first preset numbers correspond to different cell coverage ranges, or correspond to different transmit power strengths, or correspond to PCIs of different cells, or correspond to types of different cells, or correspond to first ranges of different cells, where different types of cells have different coverage ranges or different transmit power, and the first range is a range in which signal strength of this cell is greater than signal strength of a macro cell; and a sending unit 92, configured to send the multiple first preset numbers to a user equipment.

In addition, a value of the timer duration mentioned in all embodiments of the present invention may be extended as required according to a coverage range of a cell.

Finally it should be noted that, a person of ordinary skill in the art may understand that all or a part of the processes of the methods in the foregoing embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (ROM), a random access memory (RAM), or the like.

The functional units in the embodiments of the present invention may be integrated into a processing module, or each of the units may exist alone physically, or two or more units are integrated into one module. The integrated modules may be implemented in a form of hardware, or may be implemented in a form of a software functional module. When the integrated modules are implemented in a form of a software functional module and sold or used as an independent product, the integrated modules may be stored in a computer-readable storage medium. The foregoing storage medium may be a read-only memory, a magnetic disk, an optic disc, or the like. The foregoing apparatus or system may perform the methods in corresponding method embodiments.

The foregoing descriptions are merely exemplary embodiments of the present invention, but are not intended to limit the present invention. Any modification, equivalent replacement, or improvement made within the spirit and principle of the present invention shall fall within the protection scope of the present invention.

What is claimed is:

1. A radio connection re-establishment method for a user equipment (UE) to connect to a serving cell among cells including a macro cell and neighboring cells in a coverage range of the macro cell, the method comprising:

performing by the UE:
measuring the neighboring cells in the coverage range of the macro cell, and obtaining cell information of a neighboring cell of a highest signal quality in the macro cell from among the neighboring cells measured;
receiving at least one out-of-synchronization indication;
starting a timer in response to a set number of out-of-synchronization indications being obtained continuously by the receiving,
wherein:
a value of the set number of out-of-synchronization indications is set in correspondence to the cell information of the neighboring cell of the highest signal quality in the macro cell, and/or
a value of a set duration of the timer for the set number of out-of-synchronization indications is set in correspondence to the cell information of the neighboring cell of the highest signal quality in the macro cell; and
triggering a radio resource control (RRC) re-establishment procedure for the neighboring cell of the highest signal quality, in response to receiving less than a set number of synchronization indications for the neighboring cell of the highest signal quality before a timeout of the set duration of the timer for the set number of out-of-synchronization indications set in correspondence to the cell information of the neighboring cell of the highest signal quality in the macro cell,
wherein the cell information of the neighboring cell of the highest signal quality in the macro cell includes one or any combination of
a coverage range,
a transmit power strength,
a physical cell identifier (PCI),
a cell type, or
a signal range which is a range in which a signal strength of the neighboring cell of the highest signal quality is greater than a signal strength of the macro cell.

2. The radio connection re-establishment method according to claim 1, wherein the performing by the UE further comprises:

receiving a configuration message sent by a network, wherein the configuration message comprises different durations, and the different durations correspond to different cell coverage ranges, and selecting a duration to set the value of the duration of the timer among the different durations according to the coverage range of the neighboring cell of the highest signal quality in the macro cell; or receiving a configuration message sent by a network, wherein the configuration message comprises different durations, and the different durations correspond to different transmit power strengths, and according to the transmit power strength of the neighboring cell of the highest signal quality in the macro cell, selecting a duration to set the value of the duration of the timer among the different durations; or receiving a configuration message sent by a network, wherein the configuration message comprises different durations, and the different durations correspond to PCIs of cells, and according to the PCI of the neighboring cell of the highest signal quality in the macro cell, selecting a duration to set the value of the duration of the timer among the different durations; or receiving a configuration message sent by a network, wherein the configuration message comprises different durations, the different durations correspond to types of the cells, and different types of the cells have different coverage ranges or different transmit power, and according to the cell type of the neighboring cell of the highest signal quality in the macro cell, selecting a duration to set the value of duration of the timer among the different durations; or receiving a configuration message sent by a network, wherein the configuration message comprises different durations, the different durations correspond to signal ranges of the cells, and according to signal range that covers the neighboring cell of the highest signal quality in the macro cell, selecting a duration to set the value of the duration of the timer among the different durations; or receiving a configuration message sent by a network, wherein the configuration message comprises one timer duration and different scale factors, and the different scale factors correspond to different cell coverage ranges and according to the coverage range of the neighboring cell of the highest signal quality in the macro cell, selecting a scale factor among the different scale factors, multiplying the scale factor by the timer duration, and using a result of the multiplication to set the value of the duration of the timer; or receiving a configuration message sent by a network, wherein the configuration message comprises one timer duration and different scale factors, and the different scale factors correspond to different transmit power strengths, and according to the transmit power strength of the neighboring cell of the highest signal quality in the macro cell, selecting a scale factor among the different scale factors, multiplying the scale factor by the timer duration, and using a result of the multiplication to set the value of the duration of the timer; or receiving a configuration message sent by a network, wherein the configuration message comprises one timer duration and different scale factors, and the different scale factors correspond to PCIs of cells, and according to the PCI of the neighboring cell of the highest signal quality in the macro cell, selecting a scale factor among the different scale factors, multiplying the scale factor by the timer duration, and using a result of the multiplication to set the value of the duration of the timer; or receiving a configuration message sent by a network, wherein the configuration message comprises one timer duration and different durations, the different scale factors correspond to types of the cells, and different types of the cells have different coverage ranges or different transmit power, and according to the cell type of the neighboring cell of the highest signal quality in the macro cell, selecting a scale factor among the different scale factors, multiplying the scale factor by the timer duration, and using a result of the multiplication to set the value of the duration of the timer; or receiving a configuration message sent by a network, wherein the configuration message comprises one timer duration and different scale factors, the different scale factors correspond to signal ranges of the cells, and according to the signal range of the neighboring cell of the highest signal quality in the macro cell, selecting a scale factor among the different scale factors, multiplying the scale factor by the timer duration, and using a result of the multiplication to set the value of the duration of the timer.

3. The radio connection re-establishment method according to claim 1, wherein the performing by the UE further comprises:

sending a measurement result to a base station serving the macro cell; and receiving a configuration message sent according to the measurement result by the base station, wherein the configuration message is used to indicate that the macro cell served by the base station is a target cell selected with priority in the RRC re-establishment procedure.

4. A user equipment (UE), comprising:

non-transitory computer readable storage medium to store at least one program; and computer hardware configured, including configured by the at least one program, to:

measure, from among cells, neighboring cells in a coverage range of a macro cell to connect to a serving cell among the macro cell and the neighboring cells in the coverage range of the macro cell, start a timer in response to a set number of out-of-synchronization indications being obtained continuously, wherein:

a value of the set number of the out-of-synchronization indications is set in correspondence to cell information of a neighboring cell of a highest signal quality in the macro cell measured by the UE, and/or a value of a set duration of the timer for the set number of out-of-synchronization indications is set in correspondence to cell information of the neighboring cell of the highest signal quality in the macro cell; and trigger a radio resource control (RRC) re-establishment procedure for the neighboring cell of the highest signal quality, in response to receiving less than a set number of synchronization indications for the neighboring cell of the highest signal quality before a timeout of the duration of the timer for the set number of out-of-synchronization indications set in correspondence to the cell information of the neighboring cell of the highest signal quality in the macro cell, wherein the cell information of the neighboring cell of the highest signal quality in the macro cell includes one or any combination of a coverage range, a transmit power strength, a physical cell identifier (PCI), a cell type, or a signal range which is a range in which a signal strength of the neighboring cell of the highest signal quality is greater than a signal strength of the macro cell.

5. The user equipment according to claim 4, wherein the computer hardware is further configured to:

receive a configuration message sent by a network, wherein the configuration message comprises different durations, and the different durations correspond to different cell coverage ranges, and according to the coverage range of the neighboring cell of the highest signal quality in the macro cell, select a duration to set the value of the duration of the timer among the different durations; or receive a configuration message sent by a network, wherein the configuration message comprises different durations, and the different durations correspond to different transmit power strengths, and according to the transmit power strength of the neighboring cell of the highest signal quality in the macro cell, select a duration to set the value of the duration of the timer among the different durations; or receive a configuration message sent by a network, wherein the configuration message comprises different durations, and the different durations correspond to physical cell identifiers (PCIs) of cells, and according to the PCI of the neighboring cell of the highest signal quality in the macro cell, select a duration to set the value of the duration of the timer among the different durations; or receive a configuration message sent by a network, wherein the configuration message comprises different durations, the different durations correspond to types of cells, and different types of cells have different coverage ranges or different transmit power, and according to the cell type of the neighboring cell of the highest signal quality in the macro cell, select a duration to set the value of the duration of the timer among the different durations; or receive a configuration message sent by a network, wherein the configuration message comprises different durations, the different durations correspond to signal ranges of the cells, and according to the signal range that covers the neighboring cell of the highest signal quality in the macro cell, select a duration to set the value of the duration of the timer among the multiple different durations; or receive a configuration message sent by a network, wherein the configuration message comprises one timer duration and different scale factors, and the different scale factors correspond to different cell coverage ranges, and according to the coverage range of the neighboring cell of the highest signal quality in the macro cell, select a scale factor among the different scale factors, the scale factor by the timer duration, and use a result of the multiplication to set the value of the duration of the timer; or receive a configuration message sent by a network, wherein the configuration message comprises one timer duration and different scale factors, and the different scale factors correspond to different transmit power strengths, and according to the transmit power strength of the neighboring cell of the highest signal quality in the macro cell, select a scale factor among the different scale factors, multiply the scale factor by the timer duration, and use a result of the multiplication to set the value of the duration of the timer; or receive a configuration message sent by a network, wherein the configuration message comprises one timer duration and different scale factors, and the different scale factors correspond to physical cell identifiers (PCIs) of the cells, and according to the PCI of the neighboring cell of the highest signal quality in the macro cell, select a scale factor among the different scale factors, multiply the scale factor by the timer duration, and use a result of the multiplication to set the value of the duration of the timer; or receive a configuration message sent by a network, wherein the configuration message comprises one timer duration and different durations, the different scale factors correspond to types of the cells, and different types of the cells have different coverage ranges or different transmit power, and according to the cell type of the neighboring cell of the highest signal quality in the macro cell, select a scale factor among the different scale factors, multiply the scale factor by the timer duration, and use a result of the multiplication to set the value of the duration of the timer; or receive a configuration message sent by a network, wherein the configuration message comprises one timer duration and different scale factors, the different scale factors correspond to signal ranges of the cells, and according to signal range of the neighboring cell of the highest signal quality in the macro cell, select a scale factor among the different scale factors, multiply the scale factor by the timer duration, and use a result of the multiplication to set the value of the duration of the timer.

6. The user equipment according to claim 4, wherein the macro cell, among the cells, served by a base station and/or other macro cells, among the cells, served by the base station are target cells selected with priority in the RRC re-establishment procedure.

7. The user equipment according to claim 4, wherein the computer hardware is further configured to:

send a measurement result to a base station serving the macro cell, and receive a configuration message sent according to the measurement result by the base station, wherein the configuration message is used to indicate that the macro cell, among the cells, served by the base station and/or other macro cells, among the cells, served by the base station are target cells selected with priority in the RRC re-establishment procedure.

* * * * *